US012555582B2

(12) United States Patent
Nakadai et al.

(10) Patent No.: US 12,555,582 B2
(45) Date of Patent: Feb. 17, 2026

(54) CONVERSATION SUPPORT DEVICE, CONVERSATION SUPPORT SYSTEM, CONVERSATION SUPPORT METHOD, AND STORAGE MEDIUM

(71) Applicant: HONDA MOTOR CO., LTD., Tokyo (JP)

(72) Inventors: Kazuhiro Nakadai, Wako (JP); Masayuki Takigahira, Wako (JP); Naoaki Sumida, Wako (JP); Masaki Nakatsuka, Wako (JP); Kazuya Maura, Oita (JP); Kyosuke Hineno, Oita (JP); Takehito Shimizu, Oita (JP)

(73) Assignee: HONDA MOTOR CO., LTD., Tokyo (JP)

( * ) Notice: Subject to any disclaimer, the term of this patent is extended or adjusted under 35 U.S.C. 154(b) by 244 days.

(21) Appl. No.: 18/080,794

(22) Filed: Dec. 14, 2022

(65) Prior Publication Data

US 2023/0252996 A1 Aug. 10, 2023

(30) Foreign Application Priority Data

Feb. 8, 2022 (JP) ................................. 2022-018207

(51) Int. Cl.
*G10L 15/32* (2013.01)
*G10L 15/22* (2006.01)
*G10L 15/26* (2006.01)

(52) U.S. Cl.
CPC .............. *G10L 15/32* (2013.01); *G10L 15/22* (2013.01); *G10L 15/26* (2013.01)

(58) Field of Classification Search
CPC .......... G10L 15/32; G10L 15/22; G10L 15/26
See application file for complete search history.

(56) References Cited

U.S. PATENT DOCUMENTS

| 6,122,613 A | 9/2000 | Baker | |
|---|---|---|---|
| 2002/0052740 A1* | 5/2002 | Charlesworth | G06F 16/685 |
| | | | 704/E15.02 |

(Continued)

FOREIGN PATENT DOCUMENTS

| JP | 2007-017911 | 1/2007 |
|---|---|---|
| JP | 2007-033671 | 2/2007 |

(Continued)

OTHER PUBLICATIONS

Povey, et al. "Generating Exact Lattices in the West Framework", Proceedings of International Conference on Acoustics, Speech, and Signal Processing (ICASSP) 2012, Mar. 25-30, 2012 "Lattices in Kaldi", [online], Kaldi Project, <URL: https://www.kaldiasr.org/doc/lattices.html>.

(Continued)

*Primary Examiner* — Daniel C Washburn
*Assistant Examiner* — Paul J. Mueller
(74) *Attorney, Agent, or Firm* — Amin, Turocy & Watson, LLP

(57) ABSTRACT

In a conversation support device, a first voice recognition unit performs voice recognition processing on the basis of a voice signal and defines partial section text information for each partial section that is a part of an utterance section, a second voice recognition unit performs voice recognition processing on the basis of the voice signal and defines utterance section text information for each utterance section, an information integration unit integrates the partial section text information into the utterance section text information to generate integration text information, and an output processing unit outputs the integration text information to the display unit after outputting the partial section text information to the display unit.

8 Claims, 8 Drawing Sheets

(56) References Cited

U.S. PATENT DOCUMENTS

| | | | | |
|---|---|---|---|---|
| 2010/0107069 A1* | 4/2010 | Shiga | ............... | H04M 1/72403 |
| | | | | 715/728 |
| 2013/0158995 A1* | 6/2013 | Romriell | ............... | G06F 40/279 |
| | | | | 704/235 |
| 2016/0217787 A1* | 7/2016 | Tu | ........................... | G10L 25/93 |
| 2018/0336902 A1* | 11/2018 | Cartwright | ............. | G06F 16/61 |
| 2022/0115020 A1* | 4/2022 | Bradley | ................ | G06F 3/0334 |

FOREIGN PATENT DOCUMENTS

| | | |
|---|---|---|
| JP | 2009-265307 | 11/2009 |
| JP | 2019-179480 | 10/2019 |
| JP | 2020-197592 | 12/2020 |

OTHER PUBLICATIONS

Japanese Office Action for Japanese Patent Application No. 2022-018207 mailed Jul. 1, 2025.

* cited by examiner

FIG. 5

TIME ↓

えー
[E-]
レーキ
[RE-KI]
えー、木
[E-, KI]
えー、今日
[E-, KYŌ]
えー、今日は
[E-, KYŌ WA]
えー、今日は春
[E-, KYŌ WA HARU]
えー、今日は晴れ
[E-, KYŌ WA HARE]
えー、今日は晴れの
[E-, KYŌ WA HARE NO]
えー、今日は晴れのち
[E-, KYŌ WA HARE NO CHI]
えー、今日は晴れにち雨
[E-, KYŌ WA HARE NI CHI AME]
えー、今日は晴れにち雨の
[E-, KYŌ WA HARE NI CHI AME NO]
えー、今日は晴れにち雨の様
[E-, KYŌ WA HARE NI CHI AME NO YOU]
えー、今日は晴れにち雨の予定
[E-, KYŌ WA HARE NI CHI AME NO YOTEI]
えー、今日は晴れにち雨の予定です
[E-, KYŌ WA HARE NI CHI AME NO YOTEIDESU]
えー、今日は晴れにち雨の予定です。
[E-, KYŌ WA HARE NI CHI AME NO YOTEIDESU.]

RECOGNITION RESULT

CONVERSATION SUPPORT DEVICE, CONVERSATION SUPPORT SYSTEM, CONVERSATION SUPPORT METHOD, AND STORAGE MEDIUM

CROSS-REFERENCE TO RELATED APPLICATION

Priority is claimed on Japanese Patent Application No. 2022-018207, filed Feb. 8, 2022, the content of which is incorporated herein by reference.

BACKGROUND OF THE INVENTION

Field of the Invention

The present invention relates to a conversation support device, a conversation support system, a conversation support method and a storage medium.

Description of Related Art

Conventionally, in a conversation among people such as a conference, a conversation support system has been proposed to support a conversation in which a person with normal hearing and a person with hearing impairment participate. The conversation support system performs voice recognition on voice uttered in the conversation, converts it into text that indicates the speech content, and displays the converted text on a screen.

For example, the conference system described in Japanese Unexamined Patent Application, First Publication No. 2019-179480 includes a child device including a sound collecting unit, a text input unit, and a display unit, and a parent device that is connected to the child device, creates minutes using text information obtained by performing voice recognition on a voice input from the child device or text information input from the child device, and shares the created minutes with the child device. In this conference system, when the parent device participates in a conversation using text, the system performs control such that the parent device waits for the utterances of other conference participants, and transmits information for waiting for speech to the child device.

SUMMARY OF THE INVENTION

Hearing-impaired persons read text displayed on the display unit and understand the content of a conversation. In order to see the progress of the conversation, it is expected that text representing the content of the conversation will be displayed sequentially in real time. On the other hand, in order to ensure voice recognition accuracy, it is desirable to execute voice recognition collectively for the entire utterance content rather than executing it sequentially. In this case, text to be displayed is not determined until one utterance is completed, and therefore the text representing the content of the conversation cannot be displayed in real time. For this reason, hearing-impaired persons cannot follow the conversation in some cases.

Aspects according to the present invention have been made in view of the problems described above, and an object thereof is to provide a conversation support device, a conversation support system, a conversation support method, and a storage medium that can make it easier to see the progress of a conversation while ensuring the reliability of the conversation content.

In order to solve the problems described above and achieve the object, the present invention has adopted the following aspects.

(1) A conversation support device according to one aspect of the present invention includes a first voice recognition unit configured to perform voice recognition processing on the basis of a voice signal and define partial section text information for each partial section that is a part of an utterance section, a second voice recognition unit configured to perform voice recognition processing on the basis of the voice signal and define utterance section text information for each utterance section, an information integration unit configured to integrate the partial section text information into the utterance section text information to generate integration text information, and an output processing unit configured to output the integration text information to the display unit after outputting the partial section text information to the display unit.

(2) In the aspect of (1) described above, the output processing unit may define a display mode in a difference section, which is a section where a difference from the partial section text information occurs, as a display mode different from that of other sections of the integration text information in the integration text information.

(3) In the aspect of (1) or (2) described above, the information integration unit may integrate a first graph showing candidates for the partial section text information for each partial section obtained in the first voice recognition unit and scores and permutations of the candidates into a second graph showing candidates for the partial section text information for each partial section forming a part of the utterance section obtained in the second voice recognition unit and scores and permutations of the candidates to generate a combined graph, calculate an utterance section score that is a score of candidates for utterance section text information obtained by arranging the candidates based on the scores of the candidates for the partial section text information for each partial section, using the combined graph, and define the integration text information on the basis of the utterance section score.

(4) In the aspect of (3) described above, the score of candidates for the partial section text information may include acoustic cost and language cost, and the information integration unit may calculate a weighted average value of a sum of acoustic costs and a sum of language costs of the candidates for the partial section text information for each partial section in the utterance section as the utterance section score.

(5) In the aspect of any one of (1) to (4) described above, the partial section may be a section corresponding to one or a plurality of words.

(6) A computer-readable non-transitory storage medium according to another aspect of the present invention stores a program for causing a computer to function as any one of the aspects (1) to (5) described above.

(7) A conversation support system according to still another aspect of the present invention includes any one of the aspects (1) to (5) described above, and the display unit.

(8) A conversation support method according to still another aspect of the present invention includes, by a conversation support device, a first voice recognition step of performing voice recognition processing on the basis of a voice signal and defining partial section text information for each partial section that is a part of an utterance section, a second voice recognition step of performing voice recognition processing on the basis of the voice signal and defining utterance section text information for each utterance section, an information integration step of integrating the partial section text information into the utterance section text information to generate integration text information, and an output processing step of outputting the integration text information to the display unit after outputting the partial section text information to the display unit.

According to the aspects of the present invention, it is possible to make it easier to see the progress of a conversation while ensuring the reliability of the conversation content.

According to the aspect (1), (6), (7) or (8) described above, the partial section text information indicating the utterance content for each partial section is sequentially displayed on the display unit, and the integration text information in which it is integrated with the utterance section text information indicating the utterance content for each utterance section is displayed. It is possible to allow the user to see the progress of a conversation by displaying the partial section text information for each partial section in real time, and to ensure the reliability of the conversation content by displaying the integration text information for each utterance section after that.

According to the aspect (2) described above, the difference section is displayed in a display mode different from that of the other sections. Since the user can easily notice the difference section where there is a difference from the partial section text information, it is possible to avoid overlooking highly reliable conversation content in the difference section.

According to the aspect (3) described above, it is possible to improve the reliability of conversation content by referring to the candidates for the partial section text information obtained by the first voice recognition unit, in addition to the candidates for the utterance section text information obtained by the second voice recognition unit.

According to the aspect (4) described above, an utterance section score is obtained by weighting the reliability of acoustic features and the reliability of linguistic features. For this reason, it is possible to adjust the contribution of acoustic features and linguistic features to the reliability of conversation content.

According to the aspect (5) described above, the partial section text information indicating the utterance content for each word is sequentially displayed on the display unit 30, and the integration text information in which it is integrated with the utterance section text information that shows the utterance content for each utterance section is displayed. It is possible to allow the user to see the progress of a conversation by displaying the partial section text information for each partial section in real time, and to ensure the reliability of the conversation content by displaying the integration text information for each utterance section after that.

BRIEF DESCRIPTION OF THE DRAWINGS

FIG. 5 is a diagram which shows an output example of partial section text information according to the present embodiment.

DETAILED DESCRIPTION OF THE INVENTION

Figure 1:
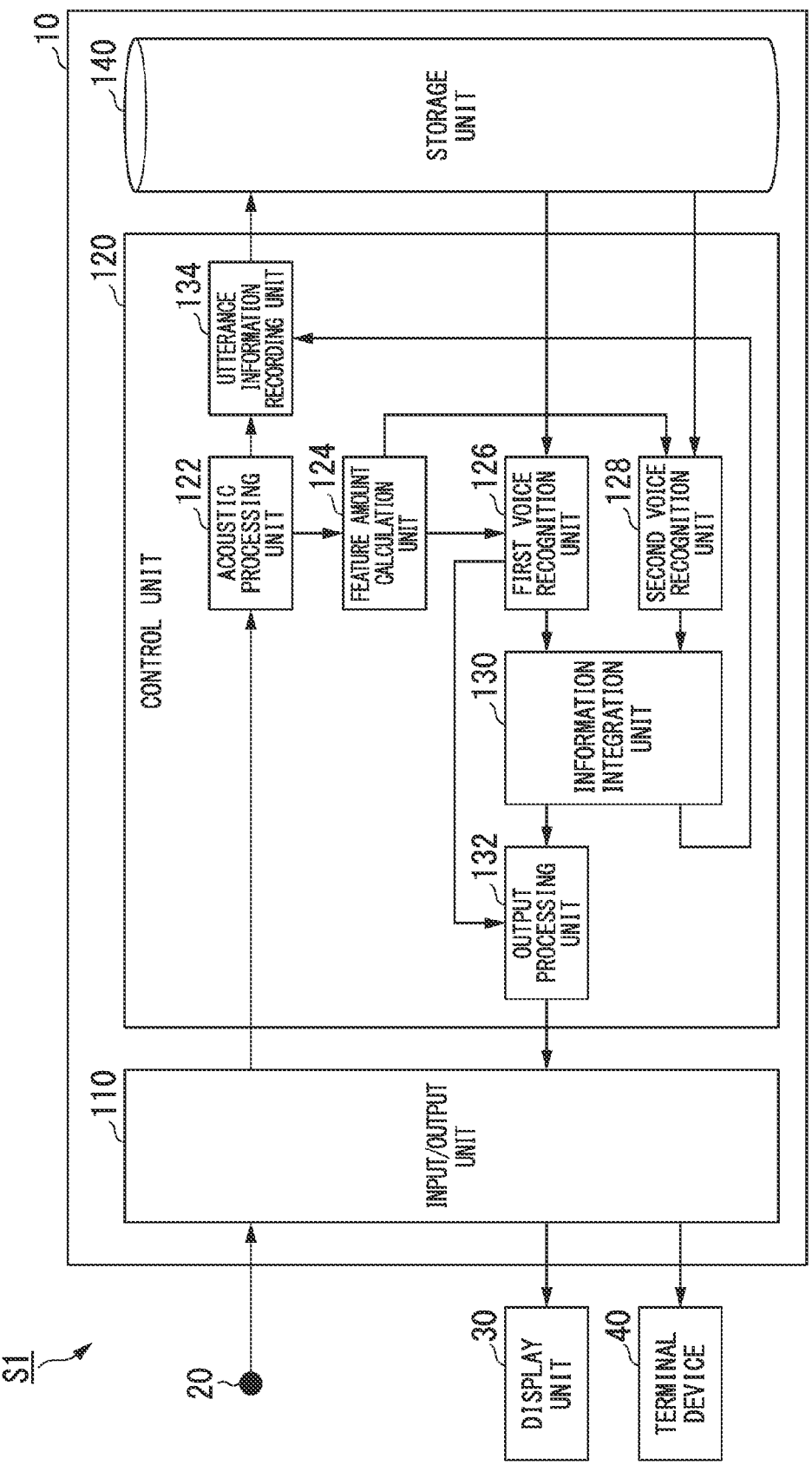
FIG. 1 is a schematic block diagram which shows a configuration example of a conversation support system according to the present embodiment.

Hereinafter, embodiments of the present invention will be described with reference to the drawings. First, a configuration example of a conversation support system S1 according to the present embodiment will be described. FIG. 1 is a schematic block diagram of the conversation support system S1 according to the present embodiment. The conversation support system S1 is configured to include a conversation support device 10, a sound collecting unit 20, a display unit 30, and a terminal device 40.

The conversation support system S1 is used in a conversation involving two or more participants. Participants may include one or more persons with disabilities in uttering and/or listening to voices (hereafter referred to as "disabled persons"). A disabled person may individually operate the terminal device 40 to input text indicating speech content (hereinafter referred to as "operation text") to the conversation support device 10. Persons who have no difficulty uttering and listening to voices (hereafter referred to as "non-disabled persons") may use the sound collecting unit 20 or a device equipped with a sound collecting unit (for example, the terminal device 40) to input uttered voice into the conversation support device 10. The conversation support device 10 performs known voice recognition processing on voice data indicating the input voice, and converts it into text indicating the speech content of the voice (hereinafter referred to as "utterance text"). Each time any one of operation text obtained by conversion or utterance text obtained from the terminal device 40 (hereinafter referred to as "speech text" and distinguished from "utterance text") is acquired, the conversation support device 10 causes the display unit 30 to display the acquired speech text. Disabled persons can read the displayed text (hereinafter referred to as "display text") to understand the speech content in the conversation.

The conversation support device 10 determines a start of a section (hereinafter referred to as an "utterance start") in which one of the participants produces one utterance (hereinafter sometimes referred to as an "utterance section") and an end of the utterance section (hereinafter referred to as an "utterance end") based on a voice signal indicating a collected voice. According to this determination, the utterance section is specified. The conversation support device 10 can execute first voice recognition processing and second voice recognition processing in parallel as voice recognition processing for an utterance section.

In the first voice recognition processing, the conversation support device 10 defines partial section text information indicating utterance content for each part of the utterance section (sometimes referred to hereinafter as a "partial section"), and outputs the defined partial section text information to the display unit 30 sequentially. The display unit 30 can display the partial section text information indicating the utterance content of each partial section as speech text in real time. That is, since a processing result of the first voice recognition processing is sequentially reflected in display text online, the first voice recognition processing is foreground processing. In the following description, features of the first voice recognition processing may be called online.

In the second voice recognition processing, the conversation support device 10 defines utterance section text information indicating the utterance content for each utterance section in parallel with the first voice recognition processing. The conversation support device 10 integrates the defined utterance section text information and partial section text information in this utterance section to generate integration text information. The conversation support device 10 outputs the generated integration text information to the display unit 30. The display unit 30 displays display text indicating utterance content represented by the integration text information. A technology for integrating utterance section text information and partial section text information will be described below.

Since an end point of an utterance section is defined when an utterance end is detected, an output of utterance section text information is delayed until the utterance section is defined at the earliest. Integration utterance section text information is displayed after the partial section text information. Since a processing result of the second voice recognition processing is not immediately reflected in display text, the second voice recognition processing becomes background processing. In the following description, this feature of the second voice recognition processing may be called offline. According to the second voice recognition processing, the utterance section text information is determined in consideration of an appearance probability of utterance content across a plurality of partial sections that constitute the utterance section (including a transition probability of utterance content between adjacent partial sections). For this reason, there may be a section where the integration text information is different from the partial section text information (hereinafter sometimes referred to as a "difference section"). The utterance section text information tends to be more reliable than the partial section text information. Therefore, the conversation support device 10 may cause display text related to the integration text information in the difference section to be displayed in a form different from display text of other sections (for example, any one item or a set of a plurality of items of a background color, a character color, a character type, a line width, a line type, a decoration, and the like). As a result, participants who have visually recognized the display text based on the integration text information can notice a change in the utterance content from displayed text based on the temporarily displayed partial section text information, and receive more reliable information.

The sound collecting unit 20 collects a voice that arrives at the host unit and outputs voice data indicating the collected voice to the conversation support device 10. The sound collecting unit 20 includes a microphone. The number of sound collecting units 20 is not limited to one, and may be two or more. The sound collecting unit 20 may be, for example, a portable wireless microphone. A wireless microphone mainly collects the utterance voice of each individual owner. The sound collecting unit 20 may be a microphone array with a plurality of microphones arranged at different positions. The microphone array outputs a plurality of channels of voice data to the conversation support device 10 as a whole. In the following description, a case where the sound collecting unit 20 is mainly a wireless microphone having one microphone will be taken as an example.

The display unit 30 displays display information based on the display data input from the conversation support device 10, for example, various display screens. The display data includes display screen data and the like, which will be described below. The display unit 30 may be a display using any method such as a liquid crystal display (LCD) or an organic electroluminescence display (OLED). A display area of the display forming the display unit 30 may be configured as a single touch panel in which detection areas of touch sensors are superimposed and integrated.

The conversation support system S1 may include an operation unit (not shown). The operation unit receives an operation of a user and outputs an operation signal corresponding to the received operation to the conversation support device 10. The operation unit may include general-purpose input devices such as a touch sensor (which may be integrated with the display unit 30), a mouse, a keyboard, and the like, or it may include dedicated members such as buttons, knobs, dials, and the like.

The terminal device 40 includes some or all of an operation unit, a display unit, and a sound collecting unit, and an input/output unit. In the following description, the operation unit, the display unit, the sound collecting unit, and the input/output unit provided in the terminal device 40 are called a terminal operation unit, a terminal display unit, a terminal sound collecting unit, and a terminal input/output unit, respectively, and thereby are distinguished from the operation unit, the display unit, the sound collecting unit, and the input/output unit provided in the conversation support device 10.

The terminal input/output unit inputs or outputs various types of data to or from the conversation support device 10. The terminal input/output unit includes, for example, an input/output interface for inputting or outputting data in a predetermined input/output method or communication method.

The terminal operation unit receives the operation of the user and outputs an operation signal corresponding to the received operation to the conversation support device 10 via the input/output unit. The terminal operation unit includes an input device.

The terminal display unit displays a display screen on the basis of display screen data input from the conversation support device 10 via the input/output unit. The terminal display unit may be integrated with the terminal operation unit and configured as a touch panel. The terminal operation unit transmits text information indicating text composed of characters instructed according to an operation to the conversation support device 10 using the terminal input/output unit during display on the display screen (text input).

The terminal sound collecting unit collects a voice that arrives at the host unit and outputs voice data indicating the collected voice to the conversation support device 10 using the terminal input/output unit. The terminal sound collecting unit includes a microphone. The voice data acquired by the terminal sound collecting unit may be subjected to voice recognition processing in the conversation support device 10.

The conversation support system S1 shown in FIG. 1 includes one conversation support device 10 and one terminal device 40, but the present invention is not limited to this. The number of terminal devices 40 may be two or more, or may also be zero. In the example shown in FIG. 1, the conversation support device 10 and the terminal device 40 have functions as a parent device and a child device, respectively.

In the present application, "conversation" means communication between two or more participants, and is not limited to communication using voice, but also includes communication using other types of information media such as text. Conversation is not limited to communication made voluntarily or arbitrarily between two or more participants, and includes communication in a form in which a specific participant (for example, moderator) controls speech of other participants, such as a conference, a presentation, a lecture, or a ceremony. "Speech" means to convey intentions using language, and it is not limited to conveying intentions by uttering voice, but also includes conveying intentions using other types of information media such as text.

(Conversation Support Device)

Next, a configuration example of the conversation support device 10 according to the present embodiment will be described. The conversation support device 10 includes an input/output unit 110, a control unit 120, and a storage unit 140.

The input/output unit 110 can input and output various types of data with other members or devices using a predetermined input/output method or a communication method in a wired or wireless manner. The input/output unit 110 may use, for example, any method of a universal serial bus (USB), an input/output method specified in IEEE1394, a communication method specified in IEEE802.11, a long-term evolution advanced (LTE-A), and a 5th generation-new radio (5G-NR), and the like. The input/output unit 110 is configured to include, for example, one or both of an input/output interface and a communication interface.

The control unit 120 realizes functions of the conversation support device 10 and controls the functions by performing various types of arithmetic processing. The control unit 120 may be realized by a dedicated member, or may be realized as a computer including a processor and a storage medium such as a read only memory (ROM) and a random-access memory (RAM). The processor reads a predetermined program stored in the ROM in advance, develops the read program in the RAM, and uses a storage area of the RAM as a work area. The processor realizes functions of the control unit 120 by executing processing instructed by various commands written in the read program. The functions to be implemented may include functions of each unit to be described below. In the following description, execution of processing instructed by a command written in the program may be called "executing the program" or "execution of the program." The processor is, for example, a central processing unit (CPU).

The control unit 120 includes an acoustic processing unit 122, a feature amount calculation unit 124, a first voice recognition unit 126, a second voice recognition unit 128, an information integration unit 130, an output processing unit 132, and an utterance information recording unit 134.

Voice data is input to the acoustic processing unit 122 from the sound collecting unit 20 via the input/output unit 110. The acoustic processing unit 122 performs predetermined preprocessing on the input voice data. Pre-processing may include, for example, known noise suppression processing. When a plurality of channels of voice data are input at once, sound source separation processing may be included as preprocessing. The acoustic processing unit 122 may perform known speaker recognition processing on voice data by sound source indicating a voice separated by the sound source separation processing to specify a speaker, and add speaker identification information indicating the specified speaker to the voice data by sound source. When voice data is input from a plurality of sound collecting units 20 to the acoustic processing unit 122, an Mic ID may be added to voice data input from a corresponding sound collecting unit 20 as identification information indicating individual sound collecting units 20. The Mic ID may also be used as speaker identification information for specifying a speaker who uses the sound collecting unit 20 exclusively.

The acoustic processing unit 122 detects an utterance section from a voice indicated in the preprocessed voice data obtained by performing preprocessing (voice data by sound source may also be included) (utterance section detection). An utterance section refers to a section in which any speaker utterances. The utterance section corresponds to a period that significantly contains components of an utterance voice collected in voice data. The utterance section corresponds to a period starting from a time when an utterance start is detected and ending at a time when a next utterance end is determined.

In the utterance section detection, the acoustic processing unit 122 can perform known voice detection processing (VAD: Voice Activity Detection) on the preprocessed voice data, and determine whether a frame to be processed at that time (hereinafter, a "current frame") is a voice section. The acoustic processing unit 122, for example, calculates power and the number of zero crossings as a feature amount indicating an utterance state for each frame of a predetermined length (for example, 10 to 50 ms) for the acquired voice data. The acoustic processing unit 122 determines, for example, a frame in which the calculated power is greater than a lower limit of power in a predetermined utterance state, and the number of zero crossings is within a range of the predetermined utterance state (for example, 300 to 1000 times per second) as voice section, and determines other frames as non-voice sections.

When an utterance state of the current frame is newly determined as a voice section although an utterance state of a predetermined number of frames up to a frame immediately before a current frame (referred to as a "previous frame" in the following description) is continuously determined to be a non-voice section (referred to as "continuous non-voice section" in the following description), the acoustic processing unit 122 determines that the utterance state of the current frame is an utterance start. In the following description, a frame whose utterance state is determined to be an utterance start is called an "utterance start frame." When the acoustic processing unit 122 determines that there is a continuous non-voice section where the utterance state of a predetermined number of frames up to a current frame is a non-voice section continuously, it determines an utterance state of a frame immediately before this continuous non-voice section as an utterance end. In the following description, a frame whose utterance state is determined to be an utterance end is called an "utterance end frame." The acoustic processing unit 122 can specify a period from an utterance start frame to a next utterance end frame as an utterance section. The acoustic processing unit 122 sequentially outputs preprocessed voice data to the feature amount calculation unit 124 and the utterance information recording unit 134 from the utterance start frame to the next utterance end frame.

The feature amount calculation unit 124 calculates an acoustic feature amount for each frame of voice data input from the acoustic processing unit 122. The acoustic feature amount is a parameter that indicates an acoustic feature of a corresponding voice. The feature amount calculation unit 124 calculates, for example, multi-dimensional Mel Frequency Cepstrum Coefficients (MFCC). The feature amount calculation unit 124 outputs the calculated acoustic feature amount to the first voice recognition unit 126 and the second voice recognition unit 128. When speaker identification information is added to voice data input for each utterance section, the feature amount calculation unit 124 may associate the speaker identification information with the acoustic feature amount and output it to the output processing unit 132 via the first voice recognition unit 126 and the second voice recognition unit 128.

The first voice recognition unit 126 performs the first voice recognition processing on the acoustic feature amount input from the feature amount calculation unit 124 in real time. As the first voice recognition processing, the first voice recognition unit 126 defines partial section text information using the learned first voice recognition model as text information indicating the utterance content of each partial section that is part of the utterance section. The first voice recognition unit 126 outputs the defined partial section text information to the information integration unit 130 and the output processing unit 132. The first voice recognition processing is on-line processing for each partial section. However, in order to express a progress of conversation in a conversation support, one partial section is set to be a period equivalent to or longer than at least time required for pronunciation according to notational units (for example, letters, numbers, symbols, or the like). As a partial section, for example, a period according to one word, phrase, or the like may be applied.

The first voice recognition unit 126 applies words as a partial section. In that case, the first voice recognition unit 126 uses an acoustic model (Acoustical Model), a context dependent model (Context Dependency), and a word dictionary (Lexicon) as mathematical models related to the first voice recognition processing. An acoustic model is used to estimate context-independent phonemes from time series containing one or more sets of acoustic feature amounts. A context-dependent model is used to estimate context-dependent phonemes from context-independent phonemes. A word dictionary is used to estimate a word from a phoneme sequence containing one or more context-dependent phonemes. The word dictionary may include word text information that indicates a natural language notation for each word.

The second voice recognition unit 128 performs the second voice recognition processing for each utterance section on the acoustic feature amount input from the feature amount calculation unit 124. That is, the second voice recognition processing is batch processing for each utterance section. As the second voice recognition processing, the second voice recognition unit 128 defines the utterance section text information using the learned second voice recognition model as the text information indicating the utterance content for each utterance section. As a mathematical model related to the second voice recognition processing, in addition to a word dictionary, an acoustic model, a context-dependent model, and a grammar model (Grammar Model) that indicates a relationship (grammatical rule) between one or more words are used. The second voice recognition unit 128 outputs the defined utterance section text information to the information integration unit 130 and the utterance information recording unit 134.

The information integration unit 130 integrates the partial section text information for each partial section input from the first voice recognition unit 126 into the utterance section text information for each utterance section input from the second voice recognition unit to generate integration text information. The information integration unit 130 defines, for example, candidates for the partial section text information for each partial section constituting an utterance section as candidates (hypothesis) for utterance section text information formed by arranging the candidates for the partial section text information using the second voice recognition model. The information integration unit 130 calculates a score (hereinafter referred to as an "utterance section score") for each candidate for the utterance section text information. The information integration unit 130 can calculate, as an utterance section score, a total sum of scores (hereinafter referred to as "partial section scores") of individual candidates for partial section text information that make up candidates for the utterance section text information. The partial section scores are real numbers that indicate reliability (confidence) of the candidates for the partial section text information. Reliability means a degree of certainty as hypothesis. As the utterance section score, for example, transition probability can be used. The information integration unit 130 can define utterance section text information that gives an utterance section score indicating the highest reliability as the integration text information. The information integration unit 130 may acquire candidates for partial section text information derived as intermediate data when the partial section text information for each partial section is defined from the first voice recognition unit 126 and candidates for partial section text information derived for each partial section as intermediate data when utterance section text information for each utterance section is defined from the second voice recognition unit 128. The information integration unit 130 outputs the generated integration text information to the output processing unit 132.

The output processing unit 132 generates display screen data that sequentially represents the partial section text information for each partial section input from the first voice recognition unit 126, and outputs the generated display screen data to the display unit 30 via the input/output unit 110.

On the other hand, integration text information for each utterance section is input to the output processing unit 132 from the information integration unit 130. The input of the integration text information is delayed more than partial section text information. The output processing unit 132 updates display screen data by replacing the partial section text information related to a corresponding utterance section with the integration text information. The output processing unit 132 outputs the updated display screen data to the display unit 30. Here, the output processing unit 132 may detect a difference section in which the integration text information of a corresponding utterance section differs from the partial section text information. The output processing unit 132 may define a display mode in the difference section temporarily (for example, within a predetermined period of time (for example, 2 to 10 seconds) starting from the detection of the difference section) or permanently to a display mode different from in other sections. Speaker identification information may be input to the output processing unit 132 in association with partial section text information and integration text information derived from the acoustic feature amount via the first voice recognition unit 126 and the information integration unit 130 for each utterance section. The output processing unit 132 may generate display screen data including the speaker identification information for a corresponding utterance section. The speaker identification information may be placed, for example, at a beginning of the partial section text information or the integration text information and may be represented by an icon, figure, symbol, or the like for identifying a corresponding speaker.

Voice data for each utterance section from an utterance start frame to an utterance end frame is input to the utterance information recording unit 134 from the acoustic processing unit 122. On the other hand, integration text information for each utterance section is input to the utterance information recording unit 134 from the information integration unit 130. The utterance information recording unit 134 records the input voice data and integration text information in the storage unit 140 in association with each other. In the storage unit 140, minutes data indicating integration text information indicating utterance content and voice data for each utterance section is formed. The voice data in an utterance section may be provided with speaker identification information for identifying a speaker.

The storage unit 140 temporarily or permanently stores various types of data. The storage unit 140 stores a program describing processing to be executed by the control unit 120, various types of data used in the processing (including various types of parameters, initial values, intermediate values, voice recognition models, and the like), and various types of data acquired by the control unit 120. The storage unit 140 is configured to include, for example, a storage medium such as the ROM and the RAM described above.

(Possibility of Real-Time Processing)

Figure 2:
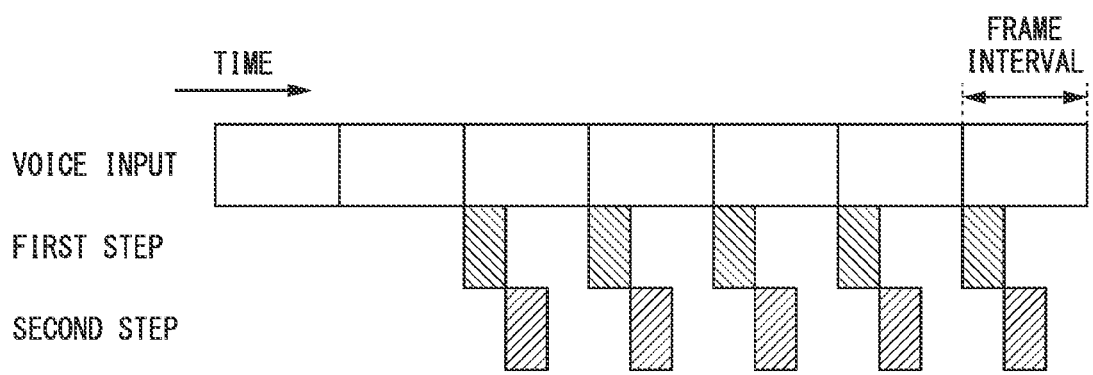
FIG. 2 is an explanatory diagram which shows a first example in which real-time processing is possible.

As described above, the first voice recognition unit 126 defines partial section text information for each partial section in real time by the first voice recognition processing and outputs it to the output processing unit 132. In order to enable real-time processing, the first voice recognition unit 126 requires that there is no processing step in which an elapsed time from an input of input information to an output of an output result exceeds an acquisition period for acquiring new input information. FIG. 2 exemplifies a voice processing procedure that allows real-time processing. In this example, a processing time taken to obtain an output result through a first step and a second step for a voice input of one frame is less than one frame.

Figure 3:
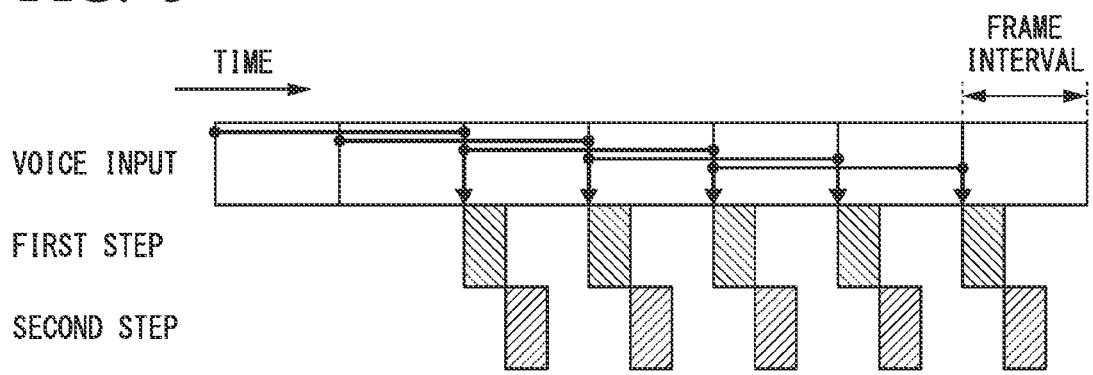
FIG. 3 is an explanatory diagram which shows a second example in which real-time processing is possible.

Even if a voice input to be processed at one time spans over a period of a plurality of frames, real-time processing is possible if the processing time is 1 frame or less when a new voice input period is 1 frame. In the example of FIG. 3, the voice input to be processed at one time is two frames, but a voice input of one of the two frames is newly acquired, and a voice input of the remaining one frame is a processing target in processing immediately before. Even in such a case, real-time processing is possible because a delay time from an input of unprocessed voice input to a time at which processing can be started does not increase.

Figure 4:
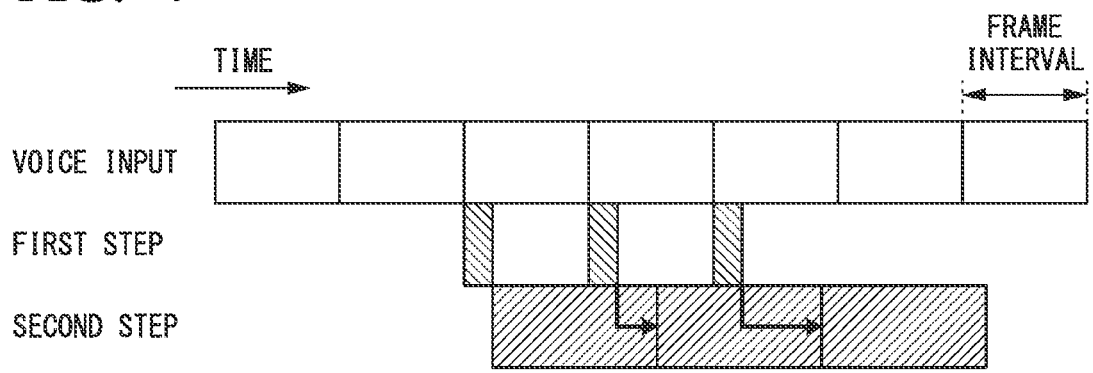
FIG. 4 is an explanatory diagram which shows an example of a case where real-time processing is not possible.

In contrast, in the example of FIG. 4, real-time processing is not possible. Even in this example, the voice input to be processed at once is two frames, and one frame of the voice input is newly acquired. However, a processing time in processing of a first step and a second step for the voice input of one frame are 0.2 frames and 1.3 frames, respectively. A timing when the processing of the second step can be started for the voice input of two frames up to a second frame is an end of the first step. This time is 0.2 frames after the voice input of the second frame. The timing at which the processing of the second step can be started for the voice input of two frames up to a third frame is an end of the processing of the second step immediately before. This timing is 0.5 frames after the voice input of the third frame. A timing at which the processing of the second step can be started for the voice input of two frames up to a fourth frame is the end of the processing of the second step immediately before. This timing is 0.8 frames after the voice input of the fourth frame. In this manner, the delay time increases before a new voice input can be processed.

FIG. 5 shows output examples of partial section text information according to the present embodiment for each time. Partial section text information, which is a processing result of the first voice recognition processing, accumulates roughly over time. In this example, the first voice recognition unit 126 defines the partial section text information with a period corresponding to one character of kanji and kana characters according to Japanese notation as a partial section, and repeatedly performs processing of outputting the defined partial section text information. In the example of FIG. 5, a Japanese text, which is a recognition result, is added character by character. "え― [e⁻]" is displayed as a recognition result at a beginning of an utterance start. At an end of an utterance section, when an auxiliary verb "です [desu]," which frequently appears at the end of Japanese declarative sentences, is recognized, it is assumed to be an end of a sentence by referring to a word dictionary or grammar dictionary. "です [desu]。" is written as utterance content at the end of the utterance section with a full stop "." for indicating the end of a sentence added.

If the first voice recognition processing can be processed in real time, the first voice recognition unit 126 may add candidates for context-independent phonemes newly acquired over time to one or a plurality of context-independent pixels that have already been estimated, and estimate candidates for other words with higher reliability. A display in real time is possible when a processing time from acquisition of a voice signal related to one new partial section to an output of speech text is shorter than an average length of the partial section. Punctuation marks may be added or removed as an estimated word changes. In the example of FIG. 5, a recognition result "え― [e⁻]" in a first line is updated to "レーキ [rēki]" in a second line, the recognition result "レーキ [rēki]" in the second line is updated to "え―、木 [e⁻, ki]" in a third line, "木 [ki]" at an end of the third line is updated to "今日 [kyō]" in a fourth line, "春 [haru]" at an end of a fifth line is updated to "晴れ [hare]" in a sixth line, "のち [nochi]" at an end of a ninth line is updated to "にち雨 [ni chi ame]," and "様 [yō]" in a twelfth line is updated to "予定 [yotei]" in a thirteenth line.

(Hypothetical Lattice Data)

The second voice recognition unit 128 executes the second voice recognition processing to define the utterance section text information for each utterance section, and outputs it to the output processing unit 132. As described above, the second voice recognition processing incudes, in addition to processing of estimating the candidate for the partial section text information for each partial section that forms an utterance section, processing of generating the candidates for utterance section text information by concatenating the candidates for partial section text information in order of partial sections in the utterance section. The second voice recognition unit 128 calculates, for each candidate for the utterance section information, a total sum of partial section scores corresponding to the candidates for the partial section text information of each partial section forming the candidates for the utterance section information as an utterance section score. The second voice recognition unit 128 can define the candidates for the utterance section text information that give the highest utterance section score as the utterance section text information as a recognition result.

In the second voice recognition processing, the second voice recognition unit 128 uses the mathematical model described above according to a known technology to generate hypothetical lattice data representing a hypothetical lattice. A hypothetical lattice indicates one or a plurality of utterance section text candidates obtained by arranging candidates for partial section text information for each partial section in an utterance section in the order as a hypothesis. Each candidate for partial section text information is associated with its order and partial section score in the utterance section. A hypothetical lattice is expressed by a directed graph having a plurality of nodes (nodal points) and one or more edges (edges, branches, links) connecting each two nodes, as exemplified in FIG. 6. Two points among the plurality of nodes are associated with a start symbol and an end symbol. A start symbol and an end symbol indicate an utterance start and an utterance end, respectively. Individual edges are associated with the candidates for partial section text information and partial section scores indicating the reliability. Therefore, the candidates for the partial section text information corresponding to each of edges forming each path from the start symbol to the end symbol are arranged in the order to represent utterance section text candidates.

Figure 6:
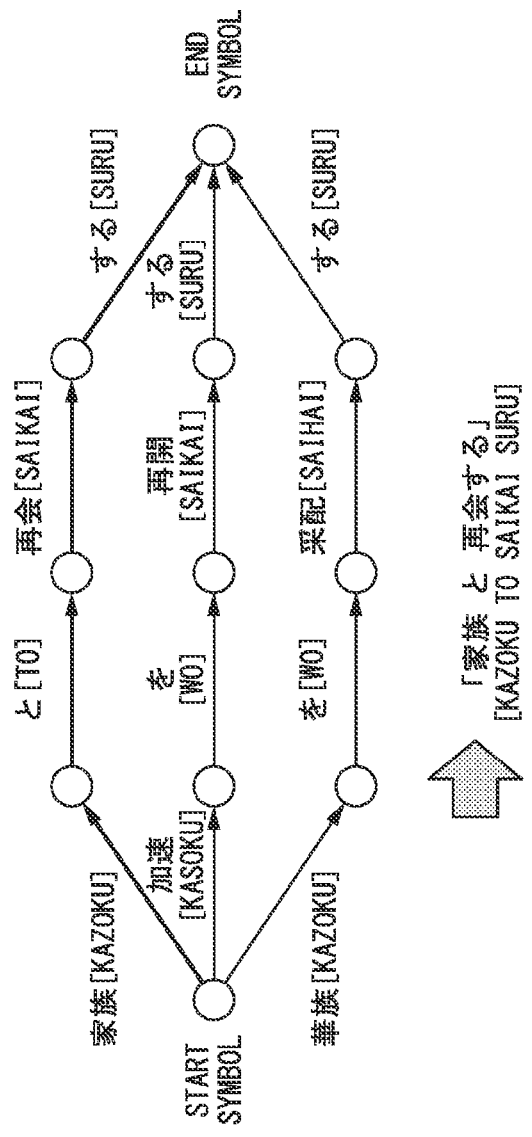
FIG. 6 is a diagram which shows an example of a hypothetical lattice.

In the example of FIG. 6, the partial section is a word, and the hypothetical lattice, as a whole, has the form of a word graph. When the partial section of interest to be processed appears at the time of the utterance start, the second voice recognition unit 128 may apply the start symbol because there is no partial section immediately before. If the partial section of interest appears at the utterance end, the second voice recognition unit 128 may apply the end symbol because there is no partial section immediately after.

Figure 7:
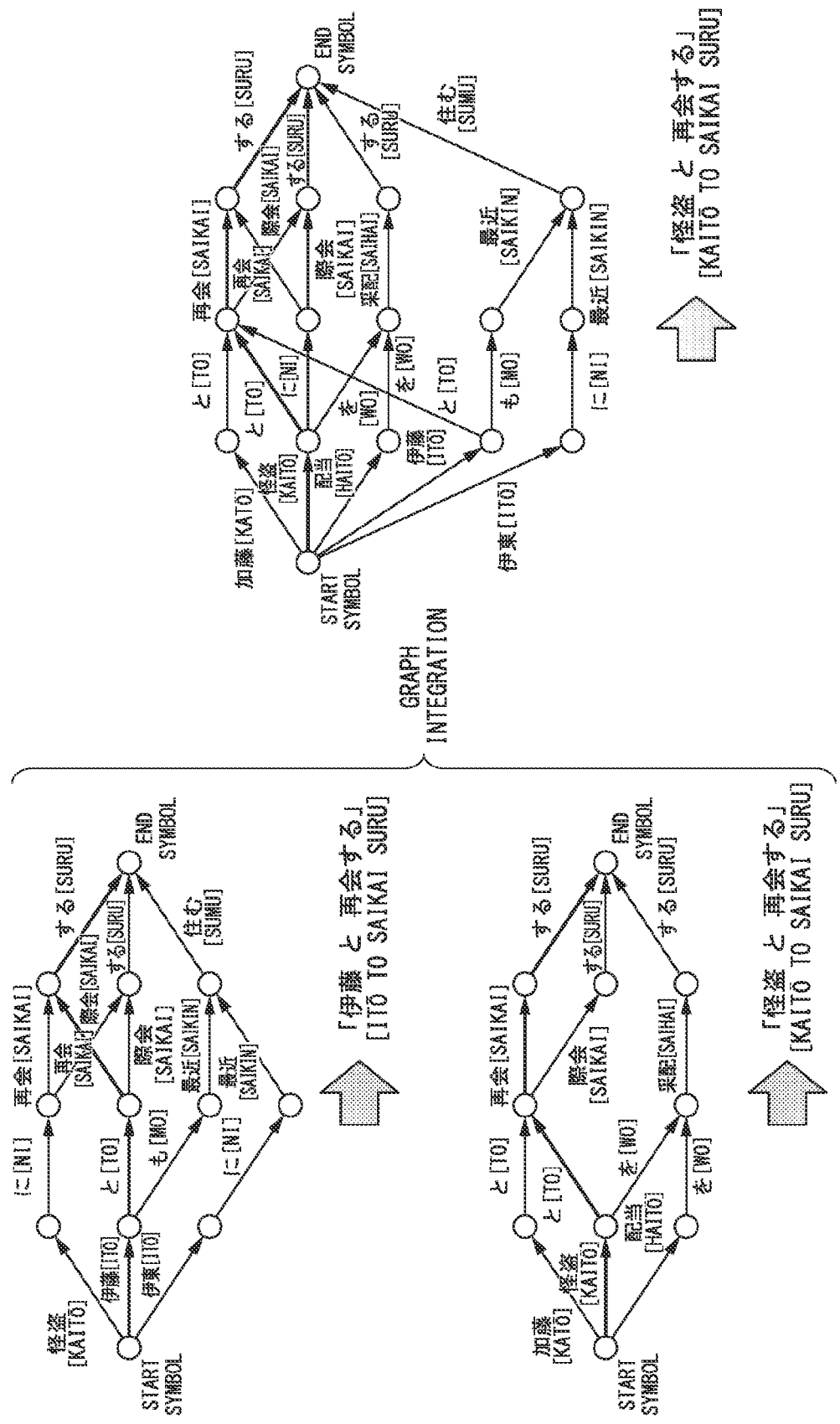
FIG. 7 is an explanatory diagram which shows an example of graph integration.

In the hypothetical lattice, if there are a plurality of candidates for a word that follows a certain edge, it will branch into a plurality of edges at a node that is a rear end of that edge. Each of the plurality of candidates for a word is associated with an individual branched edge. In the example of FIG. 7, an edge corresponding to "伊藤 [Itō]" branches into two subsequent edges at a node, and each edge is associated with "と [to]" and "も [mo]."

When the candidates for words following a plurality of edges are common, the plurality of these edges are integrated at a tip of an edge corresponding to a following word. In the example of FIG. 7, each of two edges is associated with a common word "再会 [Saikai]," edges following the two edges are integrated into one edge via a node, and are associated with "する [suru]" as a candidate for a common word.

The second voice recognition unit 128 can refer to the generated hypothetical lattice data and calculate a total sum obtained by accumulating the partial section scores given to each node for each path from a start symbol to an end symbol as the reliability score. Each partial section score can be a scalar value or a vector value. Each score may be a real value indicating higher reliability as it increases, or a real value (cost value) indicating higher reliability as it decreases. The partial section scores may be represented by, for example, a two-dimensional vector containing acoustic cost (acoustic cost) and language score (graph cost) as element values. Acoustic cost is an index value indicating a possibility that an acoustic feature amount series in a corresponding partial section is an acoustic feature amount series of words in the partial section. The acoustic cost is derived from the acoustic feature amount in a corresponding partial section using an acoustic model. Language cost is an index value indicating a possibility of appearing based on linguistic characteristics in a corresponding partial section. The language cost is derived from the acoustic feature amount, context-independent phonemes, and words in a partial section using a context-dependent model, a word dictionary, and a grammar model, respectively. The partial section scores and its elements, acoustic cost and language cost, may be represented by scaled real values so that the utterance section score is efficiently calculated and the recognition accuracy does not decrease.

When the partial section scores include the acoustic cost and the language cost, the second voice recognition unit 128 can calculate a weighted average value of an acoustic score, which is a total sum of acoustic cost, and a language score, which is a total sum of language cost, as an utterance section score. The second voice recognition unit 128 can select a path with the lowest calculated utterance section score, and concatenate words corresponding to edges forming the selected path in the order to generate utterance section text information. In the example of FIG. 6, a path shown at the top is selected among three paths starting at the start symbol and ending at the end symbol. As words corresponding to each edge of the selected path, "家族 [kazoku]," "と [to]," "再会 [saikai]," "する [suru]" are arranged in the order, and utterance content of "家族と再開する [kazoku to saikai suru]" is estimated.

The second voice recognition processing quantitatively evaluates a relationship between candidate partial sections (for example, words) for each utterance section to estimate utterance content. A length of one utterance section is typically several seconds to several tens of seconds. Since real-time processing for each utterance section is not realistic, it is processed offline. The utterance content estimated by the second voice recognition processing tends to have higher estimation accuracy than the utterance content estimated by the first voice recognition processing estimated for each partial section, but it is not necessarily limited thereto.

Therefore, the information integration unit 130 acquires candidates for the partial section text information, candidates for the context-dependent phonemes, candidates for the context-independent phoneme, and the acoustic feature amount for each partial section obtained by the first voice recognition processing in a corresponding utterance section from the first voice recognition unit 126. The information integration unit 130 performs the same procedure as in the second voice recognition processing, arranges the candidates for the acquired partial section text information in the order of partial sections, and generates data indicating the hypothetical lattice indicating the utterance section text candidates as first hypothetical lattice data. When the information integration unit 130 generates the first hypothetical lattice data, the acoustic model, the context-dependent model and the word dictionary may be used, and the grammar model may not be used.

The information integration unit 130 acquires hypothetical lattice data (hereinafter referred to as "second hypothetical lattice data") generated in the second voice recognition processing from the second voice recognition unit 128. The information integration unit 130 combines a first hypothetical lattice represented by the first hypothetical lattice data (hereinafter referred to as a "first graph") and a second hypothetical lattice represented by the second hypothetical lattice data (hereinafter referred to as a "second graph") for each utterance section, and defines an obtained graph as a combined graph (graph integration).

In graph integration, the information integration unit 130 adopts a unique (sole) edge across the first and second graphs, and partial section text information and a partial section score corresponding to the edge as elements of the combined graph. When overlapping edges exist between the first graph and the second graph, the information integration unit 130 integrates respective edges into one edge, and defines a composite value obtained by combining partial section scores of the respective edges (for example, a sum of individual partial section scores when they are transition probabilities) as a new partial section score. The information integration unit 130 adopts the integrated edge, the partial section text information corresponding to the edge, and the new partial section score as elements of the combined graph. An edge of interest to be processed and the overlapping edges have common candidates for the partial section text information corresponding to the edge of interest and it means that there is no edge corresponding to the common candidates for the partial section text information as an edge immediately before and after the edge of interest. However, the edge immediately before is not referenced when the edge of interest is an edge at a beginning of an utterance section, and the edge immediately after is not referenced when the edge of interest is an edge at an end of an utterance section. One end of the edge at the beginning of an utterance section is associated with the start symbol, and one end of the edge at the end of an utterance section is associated with the end symbol, and thereby they are distinguished from other types of edges. Therefore, intrinsic paths are paralleled in the first and second graphs before combination, and common paths are aggregated into one in the combined graph.

FIG. 7 exemplifies the first graph and second graph on the upper left and the lower left, respectively, and the combined graph on the right. For example, at a beginning of the first graph, there are edges corresponding to "怪盗 [kaitō]," "伊藤 [Itō]," and "伊東 [Itō]," respectively. At a beginning of the second graph, there are edges corresponding to "加藤 [Katō]," "怪盗 [kaitō]," and "配当 [haitō]," respectively. Between the first graph and the second graph, since the edges corresponding to "伊藤 [Itō]," "伊東 [Itō]," "加藤 [Katō]," and "配当 [haitō]" are unique, they are maintained. Since the edge corresponding to "加藤 [Katō]" is common to the first graph and the second graph, they are integrated into either one. Then, a sum of the transition probabilities, which are the partial section scores of these edges in the first graph and the second graph, is associated with an integrated edge of a new partial section score.

The first graph has an edge associated with "最近 [saikin]," but the second graph does not. On the other hand, the second graph has an edge corresponding to "采配 [saihai]," but the first graph does not. Therefore, both the edge associated with "最近 [saikin]" and the edge associated with "采配 [saihai]" are adopted. Edges, which are associated with "再会 [saikai]," and edges corresponding to "する [suru]" in subsequent edges are integrated. This is because such an edge is present in both the first graph and the second graph. A sum of weight values corresponding to each edge before integration is associated with the integrated edge as a new weight value.

The information integration unit 130 uses the combined graph to calculate the utterance section score for each path on the basis of partial section scores corresponding to edges that form individual paths, and selects a path that gives the largest utterance section score (re-evaluation). The information integration unit 130 can generate integration text information indicating utterance content in an utterance section by concatenating words corresponding to the edges forming the selected path in the order. In the example of FIG. 7, among paths from the start symbol to the end symbol, paths containing edges corresponding to "怪盗 [kaitō]," "と [to]," "再会 [saikai]," and "する [suru]" are selected. Integration text information indicating "怪盗と再開する [kaitō to saikai suru]" is generated as utterance content.

When the information integration unit 130 generates the integration text information using the combined graph, it is sufficient to generate second hypothetical lattice data indicating the candidates for the utterance section text information in the second voice recognition processing, and it is not necessary to define the only utterance section text information that will be a final processing result.

Generation of a hypothetical lattice and voice recognition using a hypothetical lattice are described in detail in the following documents. These technologies can be applied in the present embodiment.

Daniel Povey, Mirko Hannermann, et al: "GENERATING EXACT LATTICES IN THE WEST FRAMEWORK", Proceedings of International Conference on Acoustics, Speech, and Signal Processing (ICASSP) 2012, 25-30 Mar. 2012

"Lattices in Kaldi", [online], Kaldi Project, <URL: https://www.kaldi-asr.org/doc/lattices.html>

(Processing Timing)

Figure 8:
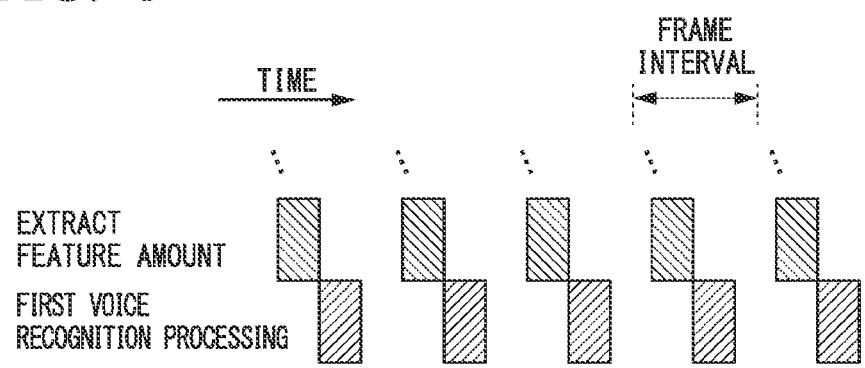
FIG. 8 is an explanatory diagram which exemplifies a timing of first voice recognition processing.

In the first voice recognition processing, online real-time processing can be performed by limiting a period to be processed at one time to a partial section. In an example of FIG. 8, the first voice recognition processing for a certain partial section is completed by a time when the acoustic feature amount for a next partial section is obtained from the feature amount calculation unit 124. The output processing unit 132 can acquire partial section text information indicating recognition results for each partial section from the first voice recognition unit 126, and display the display text indicated by the partial section text information on the display unit 30 in real time.

Figure 9:
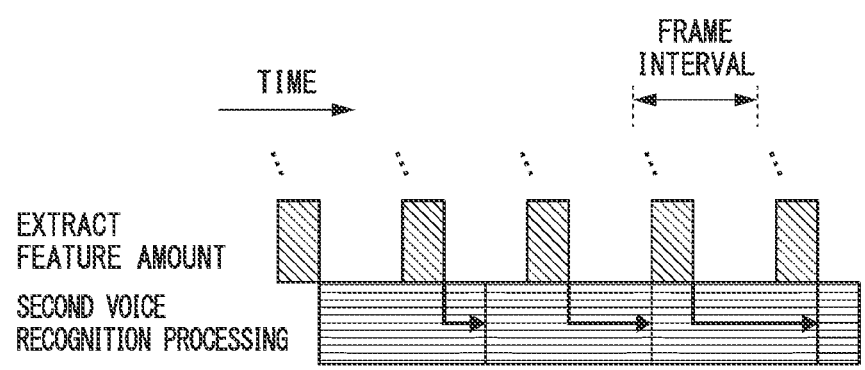
FIG. 9 is an explanatory diagram which exemplifies a timing of second voice recognition processing.

In the second voice recognition processing, since the period to be processed at once is set to an utterance section, online real-time processing is not practical. A length of one utterance section is typically several seconds to ten and several seconds, and a relevance of a plurality of partial sections is evaluated in the second voice recognition processing. In an example of FIG. 9, the second voice recognition processing for a certain partial section cannot be completed even if the acoustic feature amount for a subsequent partial section is acquired. For this reason, every time a new acoustic feature amount is acquired, a delay time from acquisition of the new acoustic feature amount to a start of the second voice recognition processing increases. In the present embodiment, the second voice recognition processing is executed offline, and utterance section text information, which is a result of processing for each utterance section, is acquired.

Figure 10:
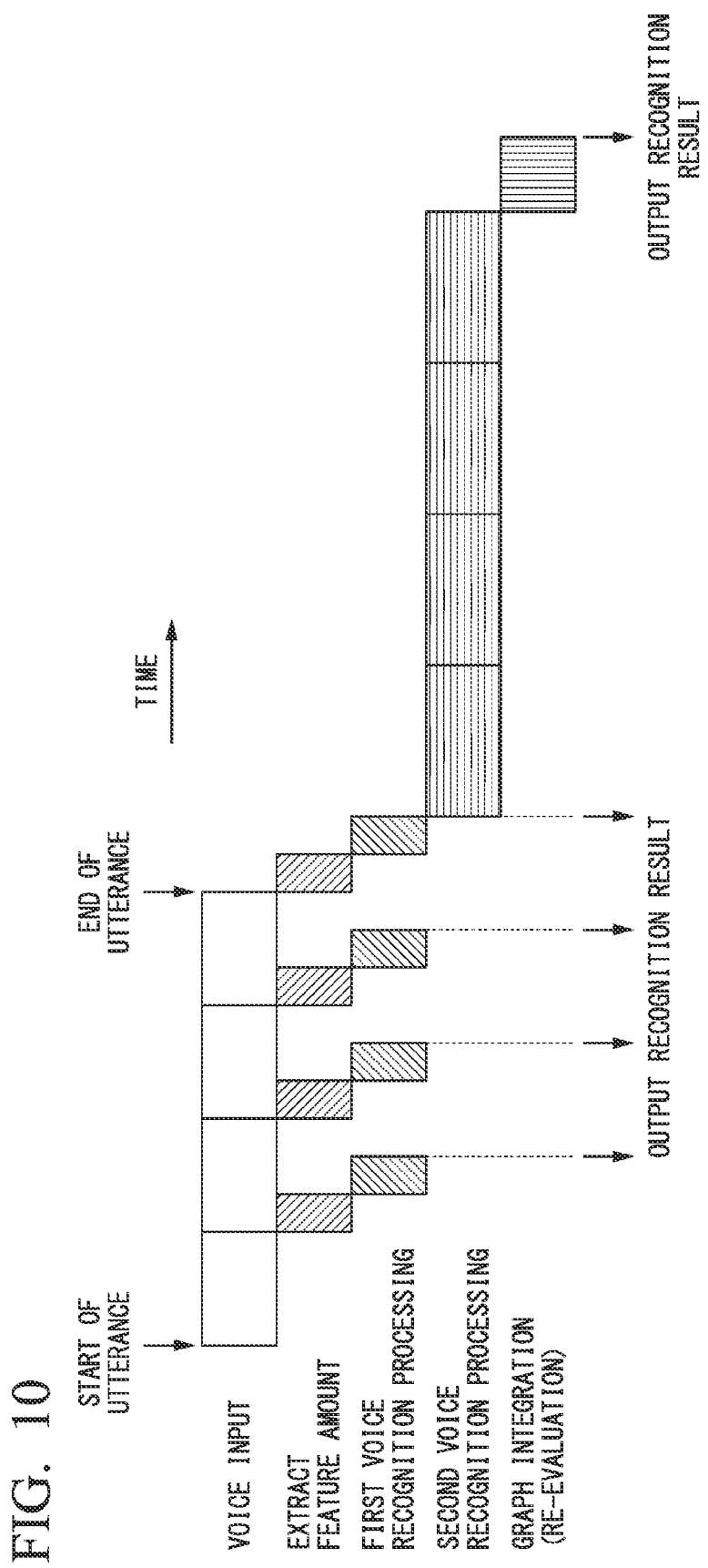
FIG. 10 is an explanatory diagram which exemplifies an output timing of integration text information.

In graph integration, a combined graph is generated by combining the first graph with the second graph. An utterance section score is calculated for each path on the generated combined graph, and a path with the maximum utterance section score is selected. The graph combination is based on a premise that the information integration unit 130 can acquire the candidates for partial section text information for each partial section, which is an element of the first graph in an utterance section, and the second graph related to the utterance section. As exemplified in FIG. 10, the graph integration is started after the first voice recognition processing and the second voice recognition processing are completed. In re-evaluation, the utterance section score for each path is calculated using the combined graph obtained by the graph integration and it is used when the integration text information is defined. Then, display text based on the integration text information is displayed on the display unit 30 in a more delayed manner than display text based on the partial section text information. In an example of FIG. 10, immediately after the completion of the first voice recognition processing for the voice data in an utterance section, display text indicating a result of recognition of the utterance section is displayed, and the second voice recognition processing can be started after that. In the present embodiment, before an end of the first voice recognition processing, an execution of the second voice recognition processing may be started after a start of the first voice recognition processing, and may be parallel with a processing period of part or all of the first voice recognition processing for the utterance section. Therefore, a processing period from the start of the first voice recognition processing to the output of the integration text information as a result of the processing is shortened.

(Conversation Support Processing)

Figure 11:
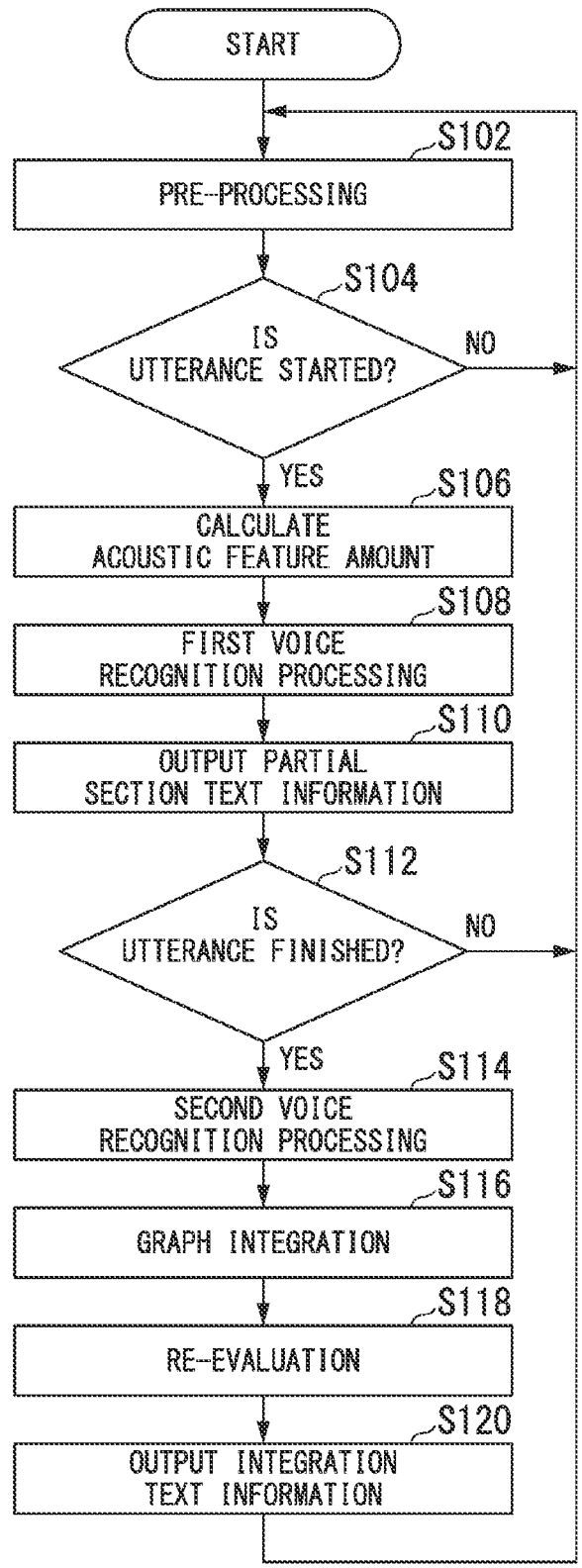
FIG. 11 is a flowchart which shows an example of conversation support processing.

Next, an example of conversation support processing according to the present embodiment will be described. FIG. 11 is a flowchart which shows an example of conversation support processing according to the present embodiment.

(Step S102) The acoustic processing unit 122 performs pre-processing on voice data input from the sound collecting unit 20.

(Step S104) The acoustic processing unit 122 performs voice detection processing on the preprocessed voice data, and determines whether an utterance has started on the basis of a detected utterance state. If an utterance start is determined (YES in step S104), the procedure proceeds to processing of step S106. If the utterance start is not determined (NO in step S104), the procedure returns to the processing of step S102.

(Step S106) The feature amount calculation unit 124 calculates the acoustic feature amount for each frame with respect to the preprocessed voice data.

(Step S108) The first voice recognition unit 126 performs first voice recognition processing on the calculated acoustic signal, and defines partial section text information indicating utterance content for each partial section that is part of an utterance section.

(Step S110) The output processing unit 132 generates display screen data indicating partial section text information for each partial section, and outputs the generated display screen data to the display unit 30. The display unit 30 displays display text indicating the utterance content of each partial section in real time.

(Step S112) The acoustic processing unit 122 performs voice detection processing on the preprocessed voice data, and determines whether the utterance is finished on the basis of the detected utterance state. If it is determined that the utterance is finished (YES in step S112), the procedure proceeds to processing of step S114. A period from utterance start to utterance end corresponds to an utterance period. If it is determined that the utterance is not finished (No in step S112), the procedure returns to the processing of step S102.

(Step S114) The second voice recognition unit 128 performs second voice recognition processing on the calculated acoustic signal, and defines utterance section text information indicating utterance content for each utterance section. In a process of the second voice recognition processing, a second graph that shows paths composed of permutations of candidates for partial section text information for each partial section belonging to an utterance section is determined.

(Step S116) The information integration unit 130 configures a first graph that shows paths composed of permutations of candidates for partial section text information in an utterance section obtained in a process of the first voice recognition processing. The information integration unit 130 combines the second graph and the first graph to generate a combined graph (graph integration).

(Step S118) The information integration unit 130 calculates (re-evaluates) an utterance section score for each path shown in the combined graph, and selects a path on the basis of the calculated utterance section score. The information integration unit 130 defines the permutations of the candidates for partial section text information corresponding to each edge forming the selected path as integration text information.

(Step S120) The output processing unit 132 replaces the partial section text information in the utterance section with the integration text information to update the display screen data, and outputs the updated display screen data to the display unit 30. Therefore, utterance content in the utterance section is updated to content shown in the integration text information.

As described above, the conversation support device 10 according to the present embodiment includes a first voice recognition unit 126 that performs voice recognition processing (for example, the first voice recognition processing) on the basis of a voice signal and defines partial section text information for each partial section that is part of the utterance section, and a second voice recognition unit 128 that performs voice recognition processing (for example, the second voice recognition processing) on the basis of the voice signal and defines utterance section text information for each utterance section. The conversation support device 10 includes the information integration unit 130 that integrates the partial section text information into the utterance section text information to generate integration text information, and the output processing unit 132 that outputs the integration text information (for example, information included in the display screen data) to the display unit 30 after outputting the partial section text information (for example, information included in the display screen data) to the display unit 30.

According to this configuration, the partial section text information indicating the utterance content of each partial section is sequentially displayed on the display unit 30, and the integration text information integrated with the utterance section text information indicating the utterance content of each utterance section is displayed. By displaying the partial section text information for each partial section in real time, it is possible to cause a user to see the progress of a conversation, and after that, by displaying the integration text information for each utterance section, it is possible to ensure a reliability of a conversation content.

In the integration text information, the output processing unit 132 may define the display mode in the difference section, which is a section in which there is a difference from the partial section text information, as a different display mode from those of other sections in the integration text information.

According to this configuration, the difference section is displayed in a different display mode from the other sections. Since the user can easily notice the difference section where a difference from the partial section text information occurs, it is possible to avoid overlooking highly reliable conversation content in the difference section.

The information integration unit 130 integrates the first graph showing the candidates for the partial section text information for each partial section obtained in the first voice recognition unit 126 and the scores and permutations of the candidates into the second graph showing the candidates for the partial section text information for each partial section forming a part of an utterance section obtained in the second voice recognition unit 128 and the scores and permutations of the candidates to generate a combined graph. The information integration unit 130 may calculate, using the combined graph, an utterance section score, which is a score of candidates for the utterance section text information obtained by arranging the candidates, based on the scores of the candidates for the partial section text information for each partial section, and define integration text information on the basis of the utterance section score.

According to this configuration, it is possible to improve reliability of the conversation content by referring to the candidates for the partial section text information obtained by the first voice recognition unit 126, in addition to the candidates for the utterance section text information obtained by the second voice recognition unit 128.

The scores of the candidates for the partial section text information include acoustic cost and language cost, and the information integration unit 130 may calculate a weighted average value of a total sum of the acoustic cost and a total sum of the language cost of the candidates for the partial section text information for each partial section in an utterance section as an utterance section score. According to this configuration, an utterance section score is obtained by weighting the reliability of acoustic features and the reliability of linguistic features. For this reason, it is possible to adjust contribution of acoustic features and linguistic features to the reliability of the conversation content.

A partial section may be a section corresponding to one or a plurality of words.

According to this configuration, partial section text information indicating the utterance content for each word is sequentially displayed on the display unit 30, and integration text information, which is obtained by integrating it with the utterance section text information indicating the utterance content for each utterance section, is displayed. It is possible to allow the user to see the progress of a conversation by displaying the partial section text information for each partial section in real time, and to ensure the reliability of the conversation content by displaying the integration text information for each utterance section after that.

Although one embodiment of the present invention has been described in detail above with reference to the drawings, the specific configuration is not limited to the description above, and various design changes, and the like can be made within a range not departing from the gist of the present invention.

For example, the sound collecting unit 20 and the display unit 30 may not be necessarily integrated with the conversation support device 10, and if one or combination of these can be connected wirelessly or by wire so that various types of data can be sent and received, these may be separate from the conversation support device 10. The utterance information recording unit 134 may be omitted.

In the description above, a case where the partial section is a word is mainly used as an example, but the present invention is not limited thereto. A partial section may be a unit other than a word, for example, a phrase, a character, or the like.

The information integration unit 130 does not necessarily have to perform graph integration when the utterance section text information and the partial section text information are integrated to generate the integration text information. The information integration unit 130 may replace the partial section text information by the first voice recognition processing in a certain utterance section with the utterance section text information by the second voice recognition processing in a corresponding partial section and adopt it as the integration text information. When there is a partial section for which the partial section text information as a recognition result cannot be specified in the utterance section text information by the second voice recognition processing, the information integration unit 130 may also include the partial section text information of the partial section obtained by the first voice recognition processing in the integration text information without rejecting it.

What is claimed is:

1. A conversation support device comprising:
a memory comprising executable components; and
a processor that executes the executable components, the executable components comprising:
   a first voice recognition unit;
   a second voice recognition unit;
   an information integration unit;
   an output processing unit; and
   a feature amount calculation unit configured to calculate an acoustic feature amount for a voice signal input from an acoustic processing unit and output the acoustic feature amount to the first voice recognition unit and the second voice recognition unit, wherein
the voice signal comprises an utterance section composed of continuous partial sections,
the acoustic feature amount is a parameter that indicates an acoustic feature of the voice signal,
the first voice recognition unit is configured to perform voice recognition processing based on the acoustic feature amount to sequentially define partial section text information for each partial section, of the continuous partial sections, by a foreground processing, and to output the partial section text information to the information integration unit and the output processing unit, and
the second voice recognition unit is configured to perform voice recognition processing based on the acoustic feature amount and to define utterance section text information for the utterance section by a background processing performed in parallel with the foreground processing, and to output the utterance section text information to the information integration unit,
the information integration unit is configured to
   integrate the partial section text information into the utterance section text information to generate integration text information,
   define candidates for the partial section text information for each partial section of the utterance section as candidates for the utterance section text information formed by arranging the candidates for the partial section text information, by using the second voice recognition unit,
   assign respective utterance section scores for the candidates for the utterance section text information, wherein the respective utterance section scores are calculated as a total sum of scores of individual candidates for the partial section text information that make up the candidates for the respective utterance section text information, and
   define, as the integration text information, one of the candidates for the utterance section text information having an utterance section score, of the utterance section scores, indicating a highest reliability, and the output processing unit is configured to display the partial section text information on a display unit in real time and to display the integration text information on the display unit after displaying the partial section text information of an end point of the utterance section on the display unit.

2. The conversation support device according to claim 1, wherein the output processing unit renders a difference section of the integration text information that differs from a corresponding section of the partial section text information in a different format relative to other sections of the integration text information.

3. The conversation support device according to claim 1, wherein the information integration unit
integrates a first graph showing the candidates for the partial section text information for each of the continuous partial sections obtained in the first voice recognition unit and scores and permutations of the candidates for the partial section text information into a second graph showing the candidates for the partial section text information for each of the continuous partial sections forming a part of the utterance section obtained in the second voice recognition unit and scores and permutations of the candidates for the partial section text information to generate a combined graph,
calculates, as the utterance section score, a score of the candidates for the utterance section text information obtained by arranging the candidates for the partial section text information based on the scores of the candidates for the partial section text information for each of the continuous partial sections, using the combined graph, and
defines the integration text information based on the utterance section score.

4. The conversation support device according to claim 3, wherein the scores of candidates for the partial section text information include acoustic cost and language cost, and
the information integration unit calculates a weighted average value of a sum of acoustic costs and a sum of language costs of the candidates for the partial section text information for each of the continuous partial sections in the utterance section as the utterance section score.

5. The conversation support device according to claim 1, wherein a partial section, of the continuous partial sections, is a section corresponding to one or a plurality of words.

6. A computer-readable non-transitory storage medium that stores a program for causing a computer to function as the conversation support device according to claim 1.

7. A conversation support system comprising:
the conversation support device according to claim 1, and
the display unit.

8. A conversation support method comprising:
calculating, by a conversation support device comprising a processor, an acoustic feature amount for a voice signal input from an acoustic processing unit, wherein the voice signal comprises an utterance section composed of continuous partial sections, and the acoustic feature amount is a parameter that indicates an acoustic feature of the voice signal;
outputting, by the conversation support device, the acoustic feature amount to a first voice recognition unit and a second voice recognition unit;
performing, by the first voice recognition unit, voice recognition processing based on the acoustic feature amount to sequentially define partial section text information for each partial section, of the continuous partial sections, by a foreground process;
outputting, by the first voice recognition unit, the partial section text information to an information integration unit and an output processing unit;
performing, by the second voice recognition unit, voice recognition processing based on the acoustic feature amount to define utterance section text information for the utterance section by a background process performed in parallel with the foreground process;
outputting, by the second voice recognition unit, the utterance section text information to the information integration unit;
integrating, by the information integration unit, the partial section text information into the utterance section text information to generate integration text information;
defining, by the information integration unit, candidates for the partial section text information for each partial section of the utterance section as candidates for the utterance section text information formed by arranging the candidates for the partial section text information;
assigning, by the information integration unit, respective utterance section scores for the candidates for the utterance section text information, wherein the respective utterance section scores are calculated as a total sum of scores of individual candidates for the partial section text information that make up the candidates for the respective utterance section text information;
defining, by the information integration unit as the integration text information, one of the candidates for the utterance section text information having an utterance section score, of the utterance section scores, indicating a highest reliability; and
displaying, by the output processing unit, the partial section text information on a display unit in real time and displaying the integration text information on the display unit after outputting the partial section text information of an end point of the utterance section to the display unit.

* * * * *